United States Patent
Mao et al.

(10) Patent No.: US 10,721,466 B2
(45) Date of Patent: Jul. 21, 2020

(54) VIDEO ENCODING METHOD, VIDEO DECODING METHOD, COMPUTER DEVICE AND STORAGE MEDIUM

(71) Applicant: TENCENT TECHNOLOGY (SHENZHEN) COMPANY LIMITED, Shenzhen, Guangdong (CN)

(72) Inventors: Xu Nan Mao, Shenzhen (CN); Xin Wei Gao, Shenzhen (CN); Li Cai Guo, Shenzhen (CN); Yong Fang Shi, Shenzhen (CN); An Lin Gao, Shenzhen (CN); Haibo Deng, Shenzhen (CN); Chen Chen Gu, Shenzhen (CN); Jing Lv, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/392,151

(22) Filed: Apr. 23, 2019

(65) Prior Publication Data

US 2019/0253704 A1  Aug. 15, 2019

Related U.S. Application Data

(63) Continuation of application No. PCT/CN2018/078609, filed on Mar. 9, 2018.

(30) Foreign Application Priority Data

Mar. 21, 2017 (CN) .......................... 2017 1 0170734

(51) Int. Cl.
*H04N 19/105* (2014.01)
*H04N 19/124* (2014.01)
(Continued)

(52) U.S. Cl.
CPC ......... *H04N 19/105* (2014.11); *H04N 19/124* (2014.11); *H04N 19/132* (2014.11); *H04N 19/139* (2014.11); *H04N 19/172* (2014.11)

(58) Field of Classification Search
CPC .. H04N 19/105; H04N 19/124; H04N 19/132; H04N 19/139; H04N 19/172; H04N 21/6379
See application file for complete search history.

(56) References Cited

U.S. PATENT DOCUMENTS 8,155,189 B2 * 4/2012 Yan .................. H04N 19/50
375/240.13
8,315,310 B2 * 11/2012 Shi .................. H04N 19/52
348/699
(Continued)

FOREIGN PATENT DOCUMENTS

CN 101778275 A 7/2010
CN 101938656 A 1/2011
(Continued)

OTHER PUBLICATIONS

International Search Report for PCT/CN2018/078609 dated, May 31, 2018 (PCT/ISA/210).

*Primary Examiner* — Mulugeta Mengesha
(74) *Attorney, Agent, or Firm* — Sughrue Mion, PLLC

(57) ABSTRACT

A video encoding method is provided. The video encoding method includes: obtaining a to-be-coded video frame; determining a current encoding mode according to current coding information and/or image feature information of the to-be-coded video frame; processing the to-be-coded video frame according to the current encoding mode to generate a current coded video frame; obtaining a current reference frame corresponding to the current coded video frame based on the current coded video frame being an inter frame; obtaining a corresponding processing reference frame (Continued)

according to resolution values of the current reference frame and the current coded video frame; and encoding the current coded video frame according to the processing reference frame to generate first coded data.

20 Claims, 12 Drawing Sheets

(51) Int. Cl.
    *H04N 19/132*     (2014.01)
    *H04N 19/172*     (2014.01)
    *H04N 19/139*     (2014.01)

(56) References Cited

U.S. PATENT DOCUMENTS

| | | |
|---|---|---|
| 8,780,987 B1 | 7/2014 | Jia |
| 9,788,077 B1 * | 10/2017 | Shen ................ H04N 21/23439 |
| 2006/0114999 A1 * | 6/2006 | Han ............... H04N 21/234381 |
| | | 375/240.19 |
| 2011/0058605 A1 | 3/2011 | Ma |
| 2014/0140407 A1 | 5/2014 | Yu et al. |
| 2018/0091818 A1 * | 3/2018 | Persson .................. H04N 19/59 |

FOREIGN PATENT DOCUMENTS

| | | |
|---|---|---|
| CN | 103813174 A | 5/2014 |
| CN | 107155107 A | 9/2017 |
| JP | 105959700 A | 9/2016 |

\* cited by examiner

VIDEO ENCODING METHOD, VIDEO DECODING METHOD, COMPUTER DEVICE AND STORAGE MEDIUM

CROSS REFERENCE TO RELATED APPLICATIONS

This application is a continuation of International Patent Application No. PCT/CN2018/078609 filed Mar. 9, 2018, which claims priority from Chinese Patent Application No. 201710170734.8, entitled "VIDEO ENCODING METHOD AND APPARATUS, AND VIDEO DECODING METHOD AND APPARATUS" filed with the Chinese Patent Office on Mar. 21, 2017, the disclosures of which are incorporated by reference in their entireties.

BACKGROUND

Field

Methods and apparatuses relate to computer technologies, and in particular, to a video encoding method, a video decoding method, a computer device, and storage media.

Related Art

With the development of digital media technologies and computer technologies, videos are applied to various fields, such as mobile communication, network monitoring, and network television. With recent improvements in hardware performance and screen resolution, users' demand for high-definition videos has increased.

Due to limited mobile bandwidth, existing encoders use a constant resolution to encode video frames. This may lead to poor video quality in some scenarios. For example, at 750 kbps, the subjective quality of high-resolution encoding is low in scenarios with high motion intensity. Upon analysis on H.264, H.265, iOS and other encoders, they have the similar problem.

SUMMARY

One or more embodiments provide a video encoding method, a video decoding method, a computer device, and storage media.

According to an aspect of an embodiment, there is provided a video encoding method that is performed by at least one processor. The video encoding method includes: obtaining, by the at least one processor, a to-be-coded video frame; determining, by the at least one processor, a current encoding mode according to current coding information and/or image feature information of the to-be-coded video frame, wherein the current encoding mode is selected from among a full resolution mode and a downsampling mode; processing, by the at least one processor, the to-be-coded video frame according to the current encoding mode to generate a current coded video frame, wherein the processing includes downsampling the to-be-coded video frame to generate the current coded video frame based on the current encoding mode being the downsampling mode, and determining the to-be-coded video frame as the current coded video frame based on the current encoding mode being the full resolution mode; obtaining, by the at least one processor, a current reference frame corresponding to the current coded video frame based on the current coded video frame being an inter frame; obtaining, by the at least one processor, a corresponding processing reference frame according to resolution values of the current reference frame and the current coded video frame, wherein the obtaining the corresponding processing reference frame includes directly determining the current reference frame as the processing reference frame based on a resolution of the current reference frame being the same as that of the current coded video frame, and otherwise, sampling the current reference frame according to a preset sampling rule to obtain the corresponding processing reference frame; and encoding, by the at least one processor, the current coded video frame according to the processing reference frame to generate first coded data, the first coded data indicating the current encoding mode.

According to other aspects of various embodiments, there is also provided apparatuses, devices, systems and non-transitory computer readable mediums consistent with the method above.

BRIEF DESCRIPTION OF THE DRAWINGS

The above and other aspects, features and advantages will become apparent from the following detailed description taken in conjunction with the accompanying drawings in which.

DETAILED DESCRIPTION

Figure 1:
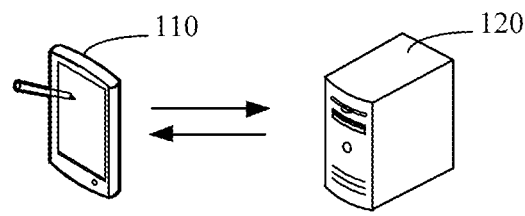
FIG. 1 is a diagram of an application environment of a video encoding method and a video decoding method according to an embodiment.

FIG. 1 is a diagram of an application environment of a video encoding method and a video decoding method according to an embodiment. As shown in FIG. 1, the application environment includes a terminal 110 and a server 120. The terminal 110 communicates with the server 120 through a network.

The terminal 110 may be a smartphone, a tablet computer, a notebook computer, a desktop computer, or the like, but is not limited thereto. The video encoding method and the video decoding method may be completed in the terminal 110 or the server 120. The terminal 110 may perform adaptive resolution encoding on a to-be-coded video frame using the video encoding method, and then send the coded video frame to the server 120, or receive coded data with an adaptive resolution from the server 120, decode the coded data using the video decoding method, and then generate a decoded video frame. The server 120 may perform transcoding on a code stream during storage. In this case, the video encoding method is completed on the server. If the server 120 needs to decode the code stream, the video decoding method is completed on the server.

Figure 2:
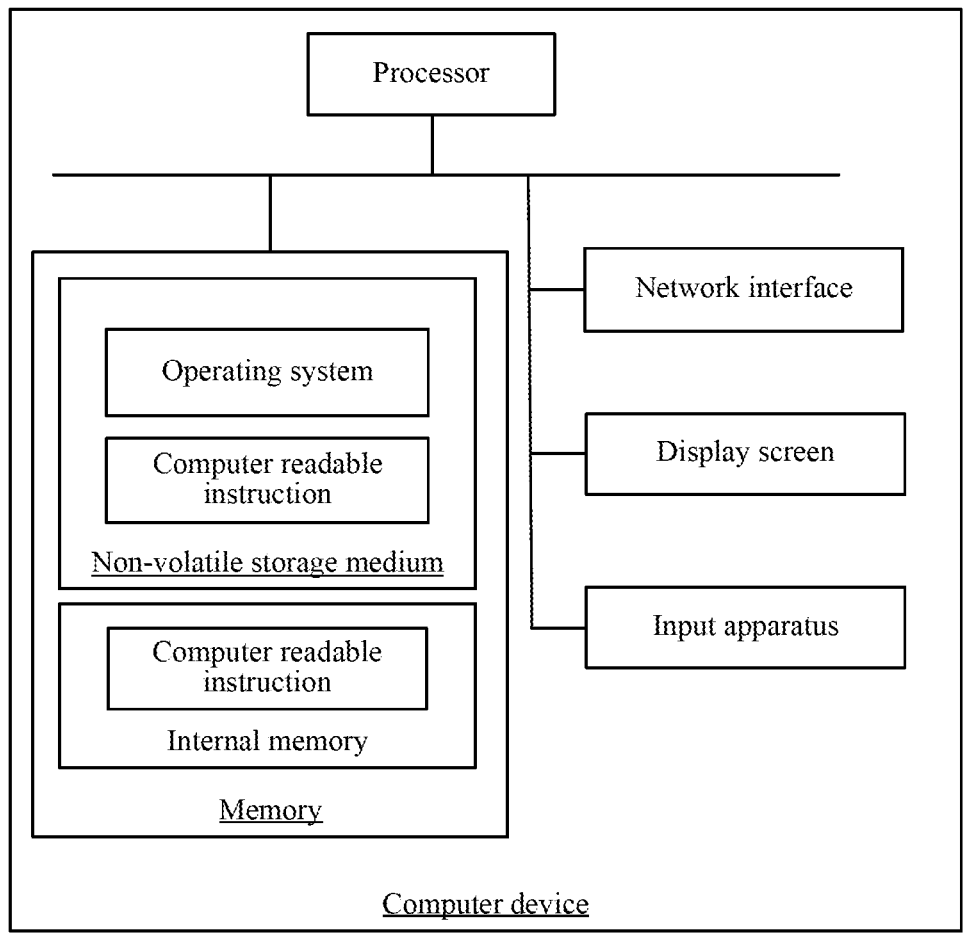
FIG. 2 is a diagram of an internal structure of a terminal in FIG. 1 according to an embodiment.

FIG. 2 is a diagram of an internal structure of a computer device according to an embodiment. The computer device may be specifically the terminal 110 in FIG. 1. The terminal 110 includes a processor, a memory, a network interface, a display screen, and an input device that are connected by a system bus. The memory includes a non-volatile storage medium and an internal memory. The non-volatile storage medium of the computer device may store an operating system and computer readable instructions. When executed, the computer readable instructions may cause the processor to perform a video encoding method or a video decoding method. The internal memory may also store computer readable instructions. When executed by the processor, the computer readable instructions may cause the processor to perform the video encoding method or the video decoding method. The processor is configured to provide computing and control capabilities, to support running of the entire terminal 110. The network interface is configured to perform network communication with the server 120. The display screen is configured to display an application interface, or the like, and may be a liquid crystal display screen or an electronic ink display screen. The input device is configured to receive a command, data, or the like input by a user, and may be a touch layer covered on the display screen, or a key, a trackball, or a touchpad disposed on a housing of a terminal, or an external keyboard, touchpad, mouse, or the like. For a terminal 110 having a touchscreen, the display screen and the input device may be the touchscreen. The structure shown in FIG. 2 is merely a block diagram of a partial structure related to an embodiment, and does not limit the terminal to which embodiments may be applied. Specifically, the terminal may include more components or fewer components than those shown in the figure, or some components may be combined, or a different component deployment may be used.

Figure 3:
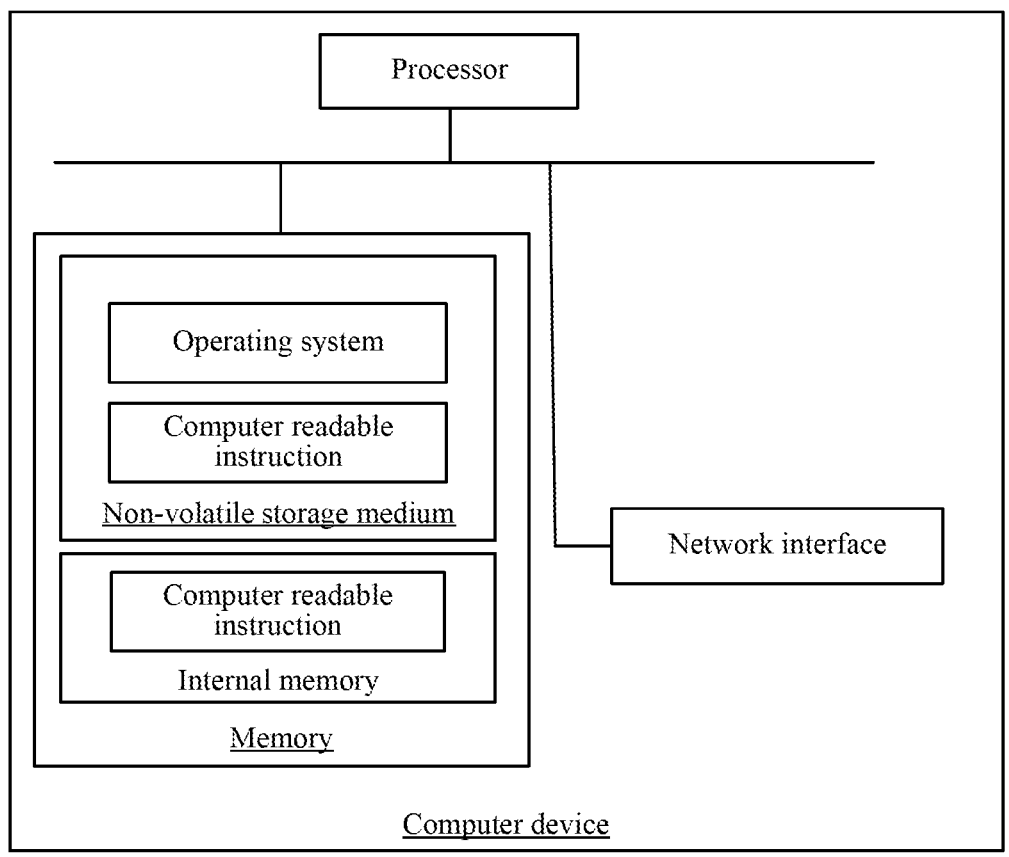
FIG. 3 is a diagram of an internal structure of a server in FIG. 1 according to an embodiment.

FIG. 3 is a diagram of an internal structure of a computer device according to an embodiment. The computer device may be specifically the server 120 in FIG. 1. The server 120 includes a processor, a memory, and a network interface that are connected by a system bus. The memory includes a non-volatile storage medium and an internal memory. The non-volatile storage medium of the computer device may store an operating system and computer readable instructions. When executed, the computer readable instructions may cause the processor to perform a video encoding method or a video decoding method. The internal memory may also store computer readable instructions. When executed by the processor, the computer readable instructions may cause the processor to perform the video encoding method or the video decoding method. The processor of the server 120 is configured to provide a calculating and control capability, to support running of the entire server 120. The network interface of the server 120 is configured to communicate with an external terminal 110 via a network connection. The structures shown in FIG. 2 and FIG. 3 are merely block diagrams of partial structures related to an embodiment, and do not limit the terminal to which embodiments may be applied. Specifically, the terminal or server may include more components or fewer components than those shown in the figures, or some components may be combined, or a different component deployment may be used.

Figure 4:
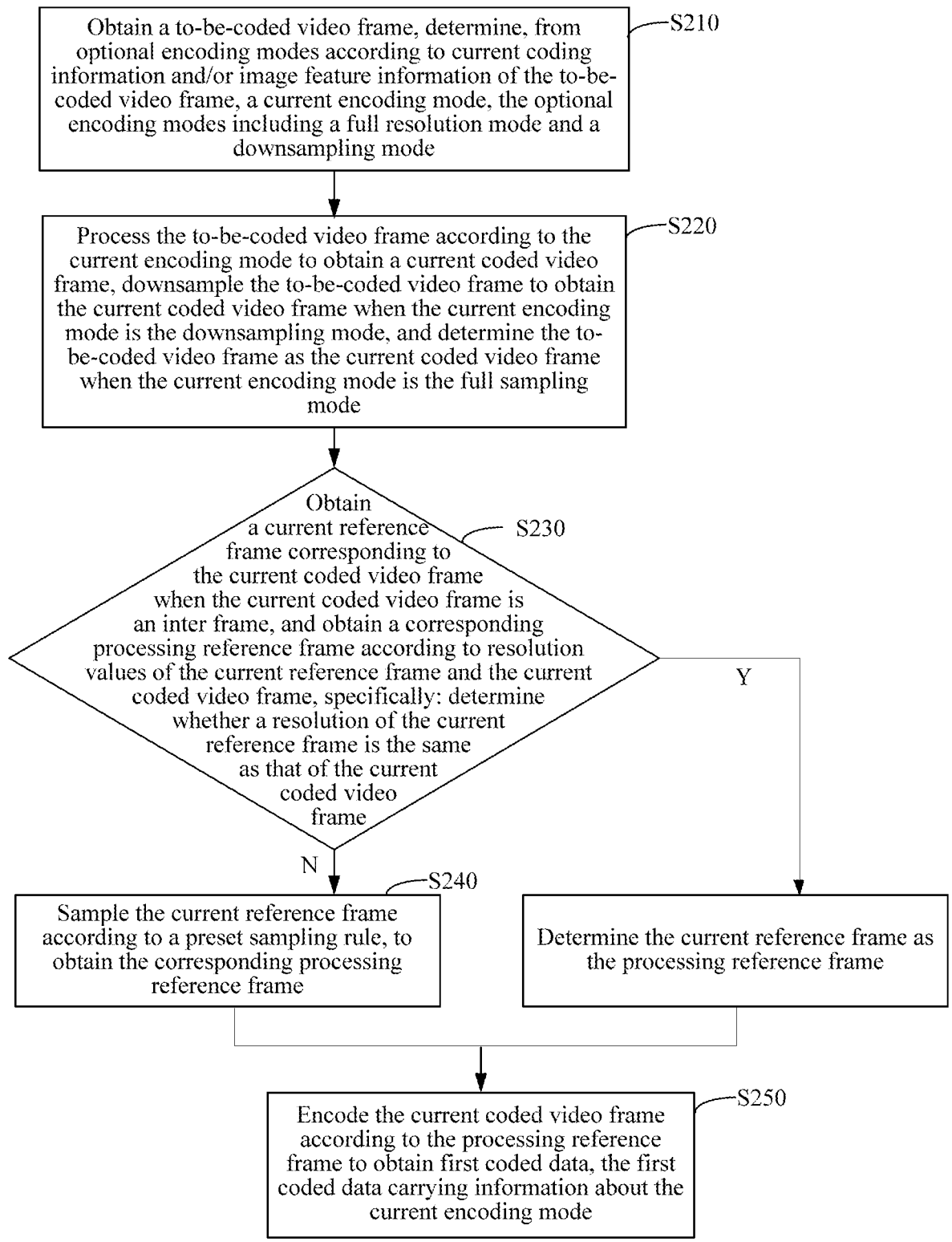
FIG. 4 is a flowchart of a video encoding method according to an embodiment.

In an embodiment, as shown in FIG. 4, a video encoding method is provided. An example in which the method is applied to the terminal or server in the foregoing application environment is used for description, and the method includes the following steps:

Step S210: Obtain a to-be-coded video frame, determine, from optional encoding modes according to current coding information and/or image feature information of the to-be-coded video frame, a current encoding mode, the optional encoding modes including a full resolution mode and a downsampling mode.

Specifically, the to-be-coded video frame may be a video frame collected in real time, for instant messaging, or a video frame corresponding to a storage video. The current coding information of a video refers to video compression parameter information of the video during encoding, for example, one or more of a frame prediction type, a motion vector, a quantization parameter, a video source, a code rate, a frame rate, and a resolution. The frame prediction type includes intra-frame prediction, such as an I frame, forward inter-frame prediction, such as a P frame, and bidirectional inter-frame prediction, such as a B frame. The image feature information refers to information related to image content, and includes one or more of image motion information and image texture information, such as an edge. The current encoding mode corresponding to the to-be-coded video frame is determined according to the current coding information and/or the image feature information, and may be a full sampling mode or a downsampling mode. The downsampling mode refers to downsampling and encoding the to-be-coded video frame. A downsampling algorithm may be user-defined according to a requirement. Downsampling includes vertical downsampling, horizontal downsampling, and vertical and horizontal downsampling. Downsampling may be performed using algorithms such as a direct average algorithm, a filter algorithm, a bicubic interpolation algorithm, and a bilinear interpolation algorithm. The full sampling mode refers to directly encoding the to-be-coded video frame.

The current coding information and/or the image feature information reflect a scenario, detail complexity, motion intensity, and the like that correspond to a video frame. For example, a motion scenario may be determined using a motion vector, a quantization parameter, and a code rate. A large quantization parameter usually indicates high motion intensity, and a large motion vector indicates that an image scenario is a large motion scenario. Determining may also be performed according to a ratio of a code rate of an encoded I frame to that of an encoded P frame or a ratio of the code rate of the encoded I frame to that of an encoded B frame. When the ratio exceeds a first preset threshold, it is determined that an image is a still image, or when the ratio is less than a second preset threshold, it may be determined that an image is an image with high motion intensity. Alternatively, a target object is directly tracked according to image content, and whether a scenario is a large motion scenario is determined according to a motion speed of the target object. A fixed code rate indicates a fixed amount of information that can be expressed. For a scenario with high motion intensity, an amount of information in a time field is large, and accordingly, a code rate that can be used for expressing information in a spatial field is small. Therefore, a relatively good image quality effect can be achieved using a low resolution, and it is more inclined to select a downsampling mode for encoding.

An image switching scenario may be determined according to the frame prediction type, and a preferred encoding mode may also be determined according to influence of the frame prediction type on other frames. For example, an I frame is usually the first frame, image switching may exist, and quality of the I frame affects quality of a subsequent P frame or B frame. Therefore, an intra-frame predicted frame is more inclined to select a full resolution for encoding compared with an inter-frame predicted frame, to ensure image quality. The P frame may be used as the reference frame of the B frame, and image quality of the P frame affects image quality of the subsequent B frame. Therefore, a full resolution is more inclined to be selected for encoding in encoding using the P frame compared with encoding using the B frame.

Texture complexity of the to-be-coded video frame is determined according to the image feature information, for example, image texture information. If texture is complex and includes a large number of details, there is a large amount of image spatial information. If downsampling is performed, a relatively large amount of detail information may be lost due to the downsampling, and video quality is affected. Therefore, a to-be-coded video frame having a complex texture is more inclined to select a full resolution for encoding compared with that having a simple texture.

According to the foregoing encoding mode selection rules, the current encoding mode may be determined from optional encoding modes according to one or more of the current coding information and/or the image feature information. When a plurality of types of information is considered, the plurality of types of information may be comprehensively weighted, and in combination with encoding mode selection rules corresponding to the information, the final current encoding mode is determined.

Step S220: Process the to-be-coded video frame according to the current encoding mode to obtain a current coded video frame, downsample the to-be-coded video frame to obtain the current coded video frame when the current encoding mode is the downsampling mode, and determine the to-be-coded video frame as the current coded video frame when the current encoding mode is the full sampling mode.

Specifically, a downsampling algorithm may be user-defined according to a requirement. Downsampling may include vertical downsampling, horizontal downsampling, and vertical and horizontal downsampling. A parameter of sampling performed in a specific direction may be user-defined according to a requirement. In a specific embodiment, horizontal ½ downsampling is performed on the to-be-coded video frame, and a width of an image after sampling is a half of that of an original video frame. Vertical ½ downsampling is performed on the to-be-coded video frame, and a height of the image after sampling is a half of that of the original video frame. If the current encoding mode is the full sampling mode, the to-be-coded video frame does not need to be sampled, and is directly used as the current coded video frame. If an image width or height obtained through downsampling is not an integral multiple of a maximum code block, pixel spreading needs to be performed on the image, so that the image width or height is an integral multiple of the maximum code block.

Step S230: Obtain a current reference frame corresponding to the current coded video frame when the current coded video frame is an inter frame, and obtain a corresponding processing reference frame according to resolution values of the current reference frame and the current coded video frame, specifically: determine whether a resolution of the current reference frame is the same as that of the current coded video frame, if yes, directly determine the current reference frame as the processing reference frame, and otherwise, proceed to step S240.

Specifically, according to different inter-frame prediction types, the current reference frame corresponding to the current coded video frame may be a forward reference frame or a directional reference frame, and there may be one or more reference frames. If the resolution of the current reference frame is the same as that of the current coded video frame, the current reference frame may be directly determined as the processing reference frame.

In an embodiment, when the current coded video frame is an intra frame, intra-frame encoding and the like are directly performed to obtain second coded data, the second coded data carrying information about the current encoding mode.

Specifically, intra-frame prediction is performed on the current coded video frame to obtain an intra-frame prediction residual, and conversion, quantization, entropy encoding, and the like are performed on the intra-frame prediction residual to obtain second coded data. To improve a prediction mode selection speed in an encoding process, a quick mode selection algorithm may be used. To achieve a target code rate, a quantization parameter is set according to a code rate control algorithm. The second coded data is obtained after encoding. The second coded data carries information about the current encoding mode. To be specific, a flag bit is further added to a code stream, and the flag bit describes whether the current coded video frame uses a full resolution or downsampling for encoding. The infra frame may also be in downsampling encoding mode, so that a packet loss problem caused by an excessively large code rate of the I frame can be effectively avoided.

Step S240: Sample the current reference frame according to a preset sampling rule, to obtain the corresponding processing reference frame.

Specifically, the preset sampling rule may be user-defined according to a requirement, and may be related to the resolution of the current coded video frame, and a distance between the reference frame and the current coded video frame. If the distance D between the current reference frame and the current coded video frame exceeds a preset threshold, 1/M downsampling is used, and otherwise, 1/N downsampling is used, where M<N. A reference value of a relatively remote current reference frame may be less than that of a relatively near current reference frame. Therefore, even if the resolution of the relatively remote current reference frame is different from that of the current coded video frame, the relatively remote current reference frame may not be sampled. Alternatively, a resolution change of the relatively remote current reference frame after sampling is enabled to be small, to accelerate a sampling speed, thereby improving an entire encoding speed. In an embodiment, a value of M varies with the distance D, thereby further improving flexibility of a sampling parameter.

Step S250: Encode the current coded video frame according to the processing reference frame to obtain first coded data, the first coded data carrying information about the current encoding mode.

Specifically, prediction is performed using the processing reference frame to obtain a prediction residual, and conversion, quantization, entropy encoding, and the like are performed on the prediction residual to obtain coded data. To improve a prediction mode selection speed in an encoding process, a quick mode selection algorithm may be used. To achieve a target code rate, a quantization parameter is set according to a code rate control algorithm. Coded data is obtained after encoding. The coded data carries information about the current encoding mode. To be specific, a flag bit is further added to a code stream, and the flag bit indicates whether the current coded video frame is a full resolution coded video frame or whether the current coded video frame has been downsampled.

In an embodiment, when the resolution of the current reference frame is different from that of the current coded video frame, the current reference frame is sampled to obtain a processing reference frame having a resolution the same as that the current coded video frame. Sampling the current reference frame includes upsampling and downsampling. If the resolution of the current reference frame is greater than that of the current coded video frame, downsampling is performed on the current reference frame to obtain the processing reference frame. If the resolution of the current reference frame is less than that of the current coded video frame, upsampling is performed on the current reference frame to obtain the processing reference frame. In an embodiment, if there is a plurality of current reference frames, each current reference frame is sampled according to the resolution of the current reference frame and the resolution of the current coded video frame to obtain a processing reference frame having a resolution the same as that of the current coded video frame.

Specifically, if the resolution of the processing reference frame is the same as that of the current coded video frame, a degree of image matching between the processing reference frame and the current coded video frame may be improved to some extent, to improve accuracy of inter-frame prediction, reduce prediction residuals, and improve quality of a coded image.

In an embodiment, a sampling algorithm for sampling the current reference frame matches a sampling algorithm by which the to-be-coded video frame is downsampled to obtain the current coded video frame in step S220. To be specific, if the current reference frame is downsampled, the downsampling algorithm is the same as the downsampling algorithm by which the to-be-coded video frame is downsampled to obtain the current coded video frame in step S220. If the current reference frame is upsampled, the upsampling algorithm is an opposite sampling algorithm matching the downsampling algorithm by which the to-be-coded video frame is downsampled to obtain the current coded video frame in step S220.

Specifically, the sampling algorithm for sampling the current reference frame matches the sampling algorithm by which the to-be-coded video frame is downsampled to obtain the current coded video frame, to further improve a degree of image matching between the current reference frame and the current coded video frame, thereby further improving accuracy of inter-frame prediction, reducing prediction residuals, and improving quality of a coded image.

In this embodiment, the to-be-coded video frame is obtained, the current encoding mode is determined from the optional encoding modes according to the current coding information and/or the image feature information of the to-be-coded video frame, the optional encoding modes including the full resolution mode and the downsampling mode, the to-be-coded video frame is processed according to the current encoding mode to obtain the current coded video frame; when the current encoding mode is the downsampling mode, downsampling is performed on the to-be-coded video frame to obtain the current coded video frame, when the current encoding mode is the full resolution mode, the to-be-coded video frame is determined as the current coded video frame, when the current coded video frame is the inter frame, the current reference frame corresponding to the current coded video frame is obtained, and the corresponding processing reference frame is obtained according to the resolution values of the current reference frame and the current coded video frame, specifically: whether the resolutions of the current reference frame and the current coded video frame are the same is determined; if yes, the current reference frame is directly determined as the processing reference frame, and otherwise, the current reference frame is sampled according to the preset sampling rule to obtain the corresponding processing reference frame; the current coded video frame is encoded according to the processing reference frame to obtain the first coded data, the first coded data carrying the information about the current encoding mode, and the encoding mode of the to-be-coded video frame may be adaptively determined according to the current coding information and/or the image feature information of the to-be-coded video frame, thereby adaptively selecting a suitable resolution for encoding in different scenarios. Spatial information is adaptively reduced by means of downsampling encoding, to improve video quality under a condition of a limited bandwidth in different scenarios. In addition, the resolution of the current reference frame is adjusted according to the resolution values of the current reference frame and the current coded video frame, so that the current reference frame can be used as the reference frame even if the current reference frame has a resolution different from that of the current coded video frame, to improve use efficiency of the reference frame, thereby improving accuracy of inter-frame prediction, reducing prediction residuals, and improving quality of a coded image.

Figure 5:
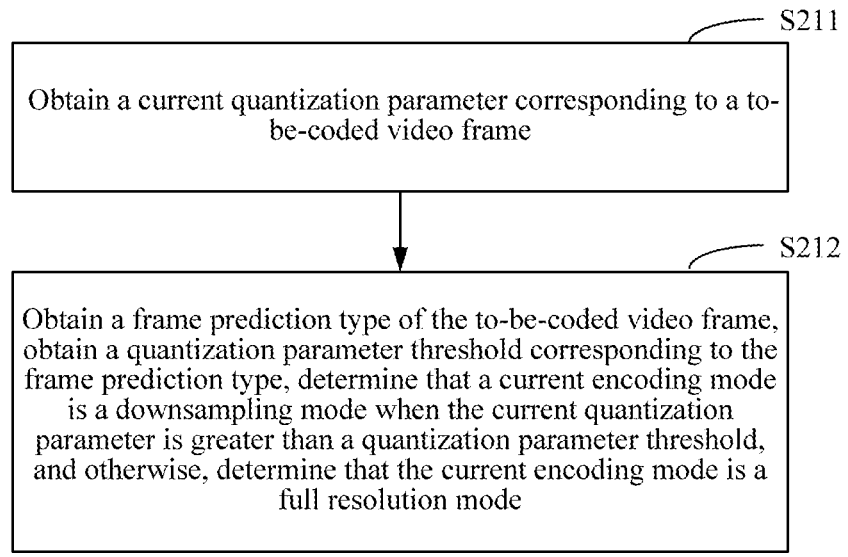
FIG. 5 is a flowchart of determining a current encoding mode according to a quantization parameter according to an embodiment.

In an embodiment, the current coding information includes quantization parameter information. As shown in FIG. 5, the step of determining, from optional encoding modes according to current coding information and/or image feature information of the to-be-coded video frame, a current encoding mode in step S210 includes the following steps:

Step S211: Obtain a current quantization parameter corresponding to the to-be-coded video frame.

Specifically, when there is no strict requirement for a code rate, a coarse-grained quantization parameter may be allocated to each to-be-coded video frame before encoding, for example, one frame corresponds to one quantization parameter. In this case, the current quantization parameter may be conveniently and quickly obtained. Alternatively, one frame is divided into different slices, and each slice corresponds to one quantization parameter. In this case, the current quantization parameter may be calculated according to a quantization parameter corresponding to each slice. For example, an average or a median of a quantization parameter corresponding to each slice is used as the current quantization parameter. When there is a strict requirement for a code rate, a fine-grained quantization parameter is allocated to each to-be-coded video frame in a unit of a macroblock during encoding. Each corresponding quantization parameter may be adjusted around a reference quantization parameter, or the reference quantization parameter is used as the current quantization parameter, or an average or a median corresponding to each macroblock is calculated as the current quantization parameter.

Step S212: Obtain a frame prediction type of the to-be-coded video frame, obtain a quantization parameter threshold corresponding to the frame prediction type, determine that the current encoding mode is the downsampling mode when the current quantization parameter is greater than the quantization parameter threshold, and otherwise, determine that the current encoding mode is the full resolution mode.

Specifically, according to an encoding mode determining rule, an intra-frame predicted frame is usually more inclined to select a full resolution for encoding compared with an inter-frame predicted frame. A full resolution is more inclined to be selected for encoding in encoding using a P frame compared with encoding using a B frame. Therefore, a quantization parameter threshold of the I frame is set to be greater than or equal to that of the P frame, and the quantization parameter threshold of the P frame is greater than or equal to that of the B frame. Only when the current quantization parameter is greater than the quantization parameter threshold, the current encoding mode is determined as the downsampling mode, and otherwise, the current encoding anode is determined as the full resolution mode. A large current quantization parameter usually indicates higher motion intensity, and the downsampling mode is more inclined to be selected for encoding in a scenario having higher motion intensity.

In this embodiment, different frame prediction types are combined with a quantization parameter by using different quantization parameter thresholds to determine the current encoding mode of the to-be-coded video frame, so that accuracy of determining the current encoding mode can be improved.

Figure 6:
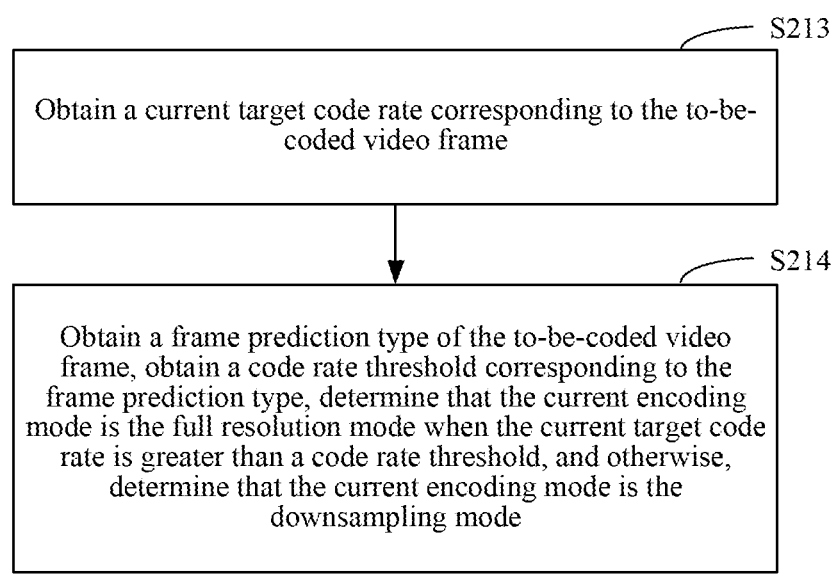
FIG. 6 is a flowchart of determining a current encoding mode according to a code rate according to an embodiment.

In an embodiment, the current coding information includes code rate information. As shown in FIG. 6, the step of determining, from optional encoding modes according to current coding information and/or image feature information of the to-be-coded video frame, a current encoding mode in step S210 includes the following steps:

Step S213: Obtain a current target code rate corresponding to the to-be-coded video frame.

Specifically, for a scenario having a strict requirement for a code rate, a frame target code rate corresponding to each frame may be calculated and allocated according to a target code rate of a code stream, and the frame target code rate corresponding to each frame may be adjusted according to a historical actual encoding code rate, and the current target code rate corresponding to the to-be-coded video frame may be calculated according to a code rate allocation algorithm.

Step S214: Obtain a frame prediction type of the to-be-coded video frame, obtain a code rate threshold corresponding to the frame prediction type, determine that the current encoding mode is the full resolution mode when the current target code rate is greater than the code rate threshold, and otherwise, determine that the current encoding mode is the downsampling mode.

Specifically, according to an encoding mode determining rule, an intra-frame predicted frame is usually more inclined to select a full resolution for encoding compared with an inter-frame predicted frame, and only intra-frame encoding is performed on the I frame, and intra-frame encoding usually has a relatively large code rate and a relatively large allocated target code rate. The full resolution is more inclined to be selected for encoding in encoding using the P frame compared with encoding using the B frame. In addition, the P frame and the B frame may be encoded with reference to other frames, and therefore a relatively small target code rate is allocated to the P frame and the B frame compared with the intra-frame predicted frame. Therefore, the code rate threshold of the I frame is set to be greater than that of the P frame, and the code rate threshold of the P frame is greater than or equal to that of the B frame. When the current target code rate is greater than the code rate threshold, it is determined that the current encoding mode is the full resolution mode, and otherwise, it is determined that the current encoding mode is the downsampling mode. When the target code rate exceeds the preset threshold, it indicates that there is a relatively large number of image details. Image details may be kept when the full resolution mode is selected for encoding, to ensure image quality.

In this embodiment, different frame prediction types are combined with a code rate using different code rate thresholds to determine the current encoding mode of the to-be-coded video frame, so that accuracy of determining the current encoding mode can be improved.

Figure 7:
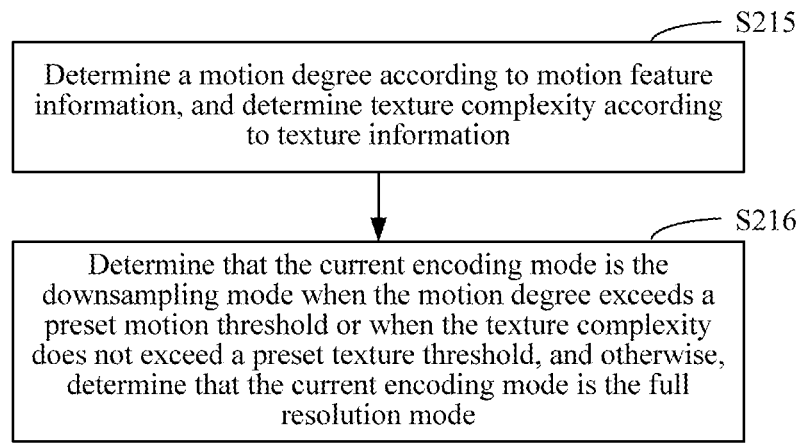
FIG. 7 is a flowchart of determining a current encoding mode according to image feature information according to an embodiment.

In an embodiment, the image feature information includes motion feature information and texture information. As shown in FIG. 7, the step of determining, from optional encoding modes according to current coding information and/or image feature information of the to-be-coded video frame, a current encoding mode in step S210 includes the following steps:

Step S215: Determine a motion degree according to the motion feature information, and determine texture complexity according to the texture information.

Specifically, motion feature information may be extracted according to image content, for example, by using an object tracking algorithm. A motion degree represents image motion intensity, and may be measured according to different features, such as a motion speed. A pixel gradient may be calculated to obtain image detail texture information, to determine texture complexity of an image.

Step S216: Determine that the current encoding mode is the downsampling mode when the motion degree exceeds a preset motion threshold or when the texture complexity does not exceed a preset texture threshold, and otherwise, determine that the current encoding mode is the full resolution mode.

Specifically, according to an encoding mode determining rule, the downsampling mode is more inclined to be selected for encoding in a scenario having high motion intensity. A to-be-coded video frame having a complex texture is more inclined to select a full resolution for encoding compared with a to-be-coded video frame having a simple texture. Therefore, when the motion degree exceeds the preset motion threshold or when the texture complexity does not exceed the preset texture threshold, it is determined that the current encoding mode is the downsampling mode, and otherwise, it is determined that the current encoding mode is the full resolution mode.

In this embodiment, the current encoding mode may be directly determined according to image content information without dependence on an encoding process. The image may be analyzed to extract image features before encoding, to obtain an encoding mode corresponding to each video frame.

Figure 8:
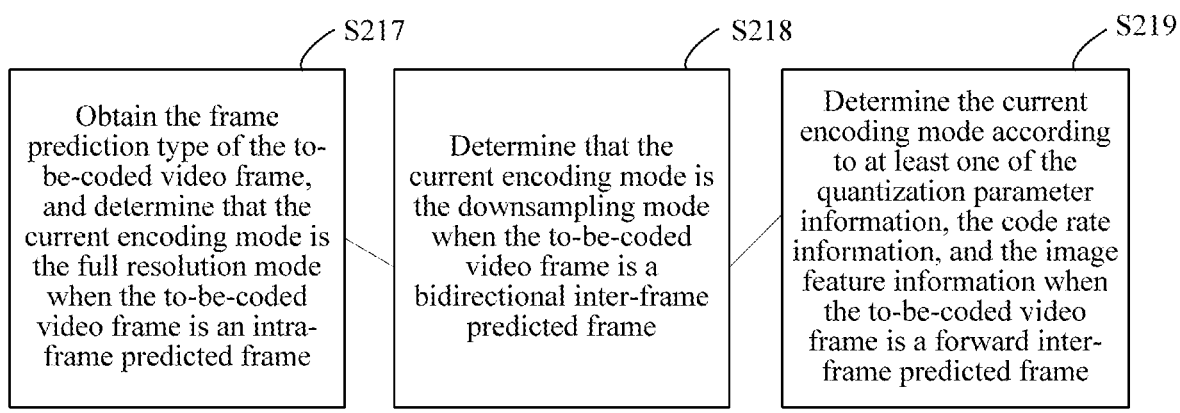
FIG. 8 is a flowchart of determining a current encoding mode according to another embodiment.

In an embodiment, as shown in FIG. 8, the step of determining, from optional encoding modes according to current coding information and/or image feature information of the to-be-coded video frame, a current encoding mode in step S210 includes the following steps:

Step S217: Obtain the frame prediction type of the to-be-coded video frame, and determine that the current encoding mode is the full resolution mode when the to-be-coded video frame is an intra-frame predicted frame.

Step S218: Determine that the current encoding mode is the downsampling mode when the to-be-coded video frame is a bidirectional inter-frame predicted frame.

Step S219: Determine the current encoding mode according to at least one of the quantization parameter information, the code rate information, and the image feature information when the to-be-coded video frame is a forward inter-frame predicted frame.

Specifically, according to the frame prediction type, when the to-be-coded video frame is the intra-frame predicted frame, it is determined that the current encoding mode is the full resolution mode, so that encoding quality of the I frame is ensured. When the to-be-coded video frame is the bidirectional inter-frame predicted frame, it is determined that the current encoding mode is the downsampling mode. When the to-be-coded video frame is the forward inter-frame predicted frame, the current encoding mode is determined according to at least one of the quantization parameter information, the code rate information, and the image feature information, so that the current encoding mode can be quickly determined for a specific frame prediction type, thereby improving encoding efficiency.

Figure 9:
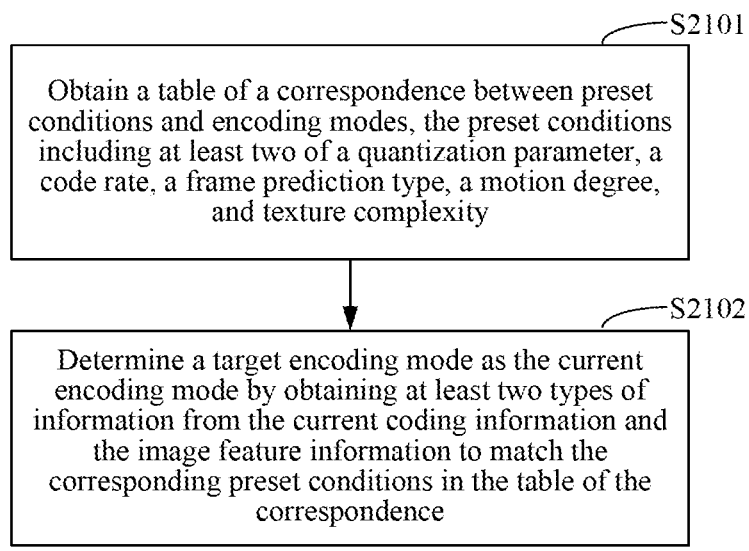
FIG. 9 is a flowchart of determining a current encoding mode according to still another embodiment.

In an embodiment, the current coding information includes the quantization parameter information, the code rate information, and the frame prediction type. The image feature information includes the motion feature information and the texture information. As shown in FIG. 9, the step of determining, from optional encoding modes according to current coding information and/or image feature information of the to-be-coded video frame, a current encoding mode in step S210 includes the following steps:

Step S2101: Obtain a table of a correspondence between preset conditions and encoding modes, the preset conditions including at least two of a quantization parameter, a code rate, a frame prediction type, a motion degree, and texture complexity.

Specifically, encoding modes corresponding to different preset conditions are listed in the table of the correspondence, and an encoding mode is determined according to at least two preset conditions. The preset conditions may be user-defined according to a requirement. For example, the quantization parameter is greater than a first preset threshold, or the code rate is greater than a second preset threshold. A plurality of preset conditions are combined, so that the encoding mode can be quickly determined by using the table.

Step S2102: Determine a target encoding mode as the current encoding mode by obtaining at least two types of information from the current coding information and the image feature information to match the corresponding preset conditions in the table of the correspondence.

Specifically, at least two types of information are obtained from the current coding information and the image feature information, and may be at least two types of information in the current coding information, for example, a code rate and a frame prediction type, may be at least two types of information in the image feature information, for example, texture information and a motion speed, and may be at least two types of information formed by a combination of the current coding information and the image feature information, for example, a code rate and texture information. A corresponding target encoding mode is determined as the current encoding mode according to preset conditions met by information by means of table look-up. When the current encoding mode is determined according to two or more types of information, the current encoding mode can be quickly obtained through table look-up, and this is simple and convenient.

Figure 10:
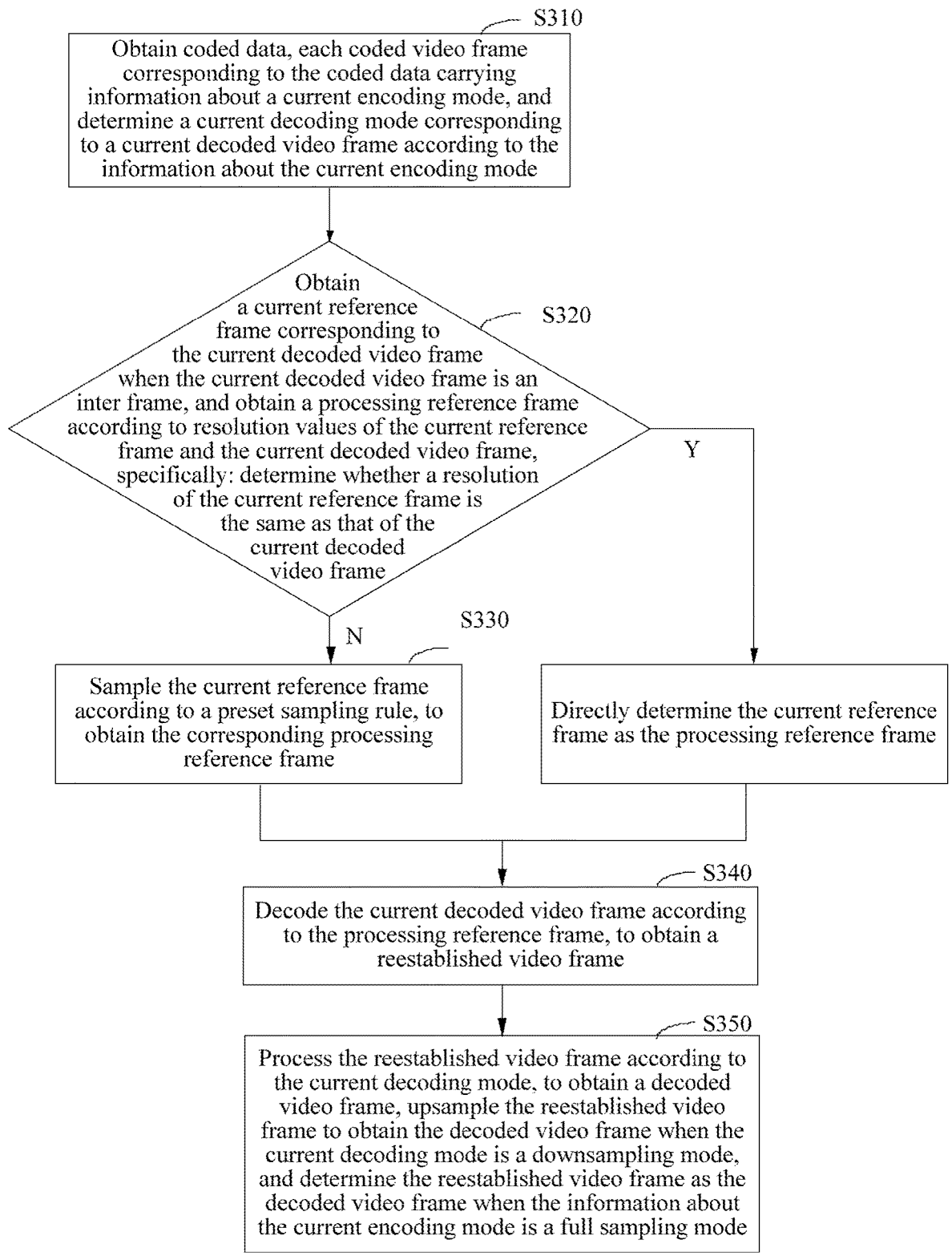
FIG. 10 is a flowchart of a video decoding method according to an embodiment.

In an embodiment, as shown in FIG. 10, a video decoding method is provided. An example in which the method is applied to the terminal or server in the foregoing application environment is used for description, and the method includes the following steps:

Step S310: Obtain coded data, each coded video frame corresponding to the coded data carrying information about a current encoding mode, and determine a current decoding mode corresponding to a current decoded video frame according to the information about the current encoding mode.

Specifically, a flag bit corresponding to a preset position in a code stream may be obtained, and information about the current encoding mode is obtained by using the flag bit, thereby determining whether the current decoding mode is the full resolution mode or the downsampling mode. The current decoding mode is the same as the current encoding mode.

Step S320: Obtain a current reference frame corresponding to the current decoded video frame when the current decoded video frame is an inter frame, and obtain a processing reference frame according to resolution values of the current reference frame and the current decoded video frame, specifically: determine whether a resolution of the current reference frame is the same as that of the current decoded video frame, if yes, directly determine the current reference frame as the processing reference frame, and otherwise, proceed to step S330.

Specifically, according to different inter-frame prediction types, the current reference frame corresponding to the current decoded video frame may be a forward reference frame or a directional reference frame, and there may be one or more reference frames. If the resolution of the current reference frame is the same as that of the current decoded video frame, the current reference frame may be directly determined as the processing reference frame.

In an embodiment, when the current decoded video frame is an intra frame, decoding is directly performed to obtain a reestablished video frame.

Step S330: Sample the current reference frame according to a preset sampling rule, to obtain the corresponding processing reference frame.

Specifically, the preset sampling rule used during decoding is the same as the preset sampling rule used during encoding, and may be related to the resolution of the current coded video frame and a distance between the current reference frame and the current coded video frame. If the distance D between the current reference frame and the current coded video frame exceeds a preset threshold, 1/M downsampling is used, and otherwise, 1/N downsampling is used, where M<N. A reference value of a relatively remote reference frame may be less than that of a relatively near reference frame. Therefore, even if the resolution of the relatively remote current reference frame is different from that of the current coded video frame, the relatively remote current reference frame may not be sampled, or a resolution change of the relatively remote current reference frame after sampling is enabled to be small, so that a sampling speed can be accelerated by using the same method during decoding, thereby improving an entire decoding speed. In an embodiment, a value of M varies with the distance D, thereby further improving flexibility of a sampling parameter. In an embodiment, when the resolution of the current reference frame is different from that of the current decoded video frame, the current reference frame is sampled to obtain a processing reference frame having a resolution the same as that the current decoded video frame. Sampling the current reference frame includes upsampling and downsampling. If the resolution of the current reference frame is greater than that of the current decoded video frame, downsampling is performed on the current reference frame to obtain the processing reference frame. If the resolution of the current reference frame is less than that of the current coded video frame, upsampling is performed on the current reference frame to obtain the processing reference frame. In an embodiment, if there is a plurality of current reference frames, each current reference frame is sampled according to the resolution of the reference frame and the resolution of the current decoded video frame to obtain a processing reference frame having a resolution the same as that of the current decoded video frame.

In an embodiment, a sampling algorithm for sampling the current reference frame matches the sampling algorithm by which the reestablished video frame is downsampled to obtain the decoded video frame in step S340. To be specific, if the reference frame is downsampled, the downsampling algorithm is the same as the downsampling algorithm by which the reestablished video frame is downsampled to obtain the decoded video frame in step S340. If the reference frame is upsampled, the upsampling algorithm is an opposite sampling algorithm matching the downsampling algorithm by which the reestablished video frame is downsampled to obtain the decoded video frame in step S340.

Step S340: Decode the current decoded video frame according to the processing reference frame, to obtain a reestablished video frame.

Specifically, the prediction residual is decoded and is superposed with a predicted pixel corresponding to the processing reference frame, to obtain the reestablished video frame.

Step S350: Process the reestablished video frame according to the current decoding mode, to obtain a decoded video frame, upsample the reestablished video frame to obtain the decoded video frame when the current decoding mode is a downsampling mode, and determine the reestablished video frame as the decoded video frame when the information about the current encoding mode is a full sampling mode.

Specifically, the algorithm for upsampling the reestablished video frame is an opposite sampling algorithm matching the algorithm by which an encoding end downsamples the to-be-coded video frame to obtain the current coded video frame.

In this embodiment, the coded data is obtained, each coded video frame corresponding to the coded data carrying information about the current encoding mode, the current decoding mode corresponding to the current decoded video frame is determined according to the information about the current encoding mode, when the current decoded video frame is the inter frame, the current reference frame corresponding to the current decoded video frame is obtained, and the processing reference frame is obtained according to the resolution values of the current reference frame and the current decoded video frame, specifically: whether the resolutions of the current reference frame and the current decoded video frame are the same is determined; if yes, the current reference frame is directly determined as the processing reference frame, and otherwise, the current reference frame is sampled according to the preset sampling rule to obtain the corresponding processing reference frame; the current decoded video frame is decoded according to the processing reference frame to obtain the reestablished video frame, the reestablished video frame is processed according to the current decoding mode to obtain the decoded video frame; if the current decoding mode is the downsampling mode, the reestablished video frame is upsampled to obtain the decoded video frame, or if the information about the current encoding mode is the full sampling mode, the reestablished video frame is determined as the decoded video frame. For a code stream encoded in an adaptive change mode, the resolution of the reference frame may be adaptively adjusted for decoding. The code stream encoded in the adaptive change mode is a code stream encoded by selecting a suitable resolution in different scenarios, thereby providing decoding support for a code stream having high image quality.

Figure 11:
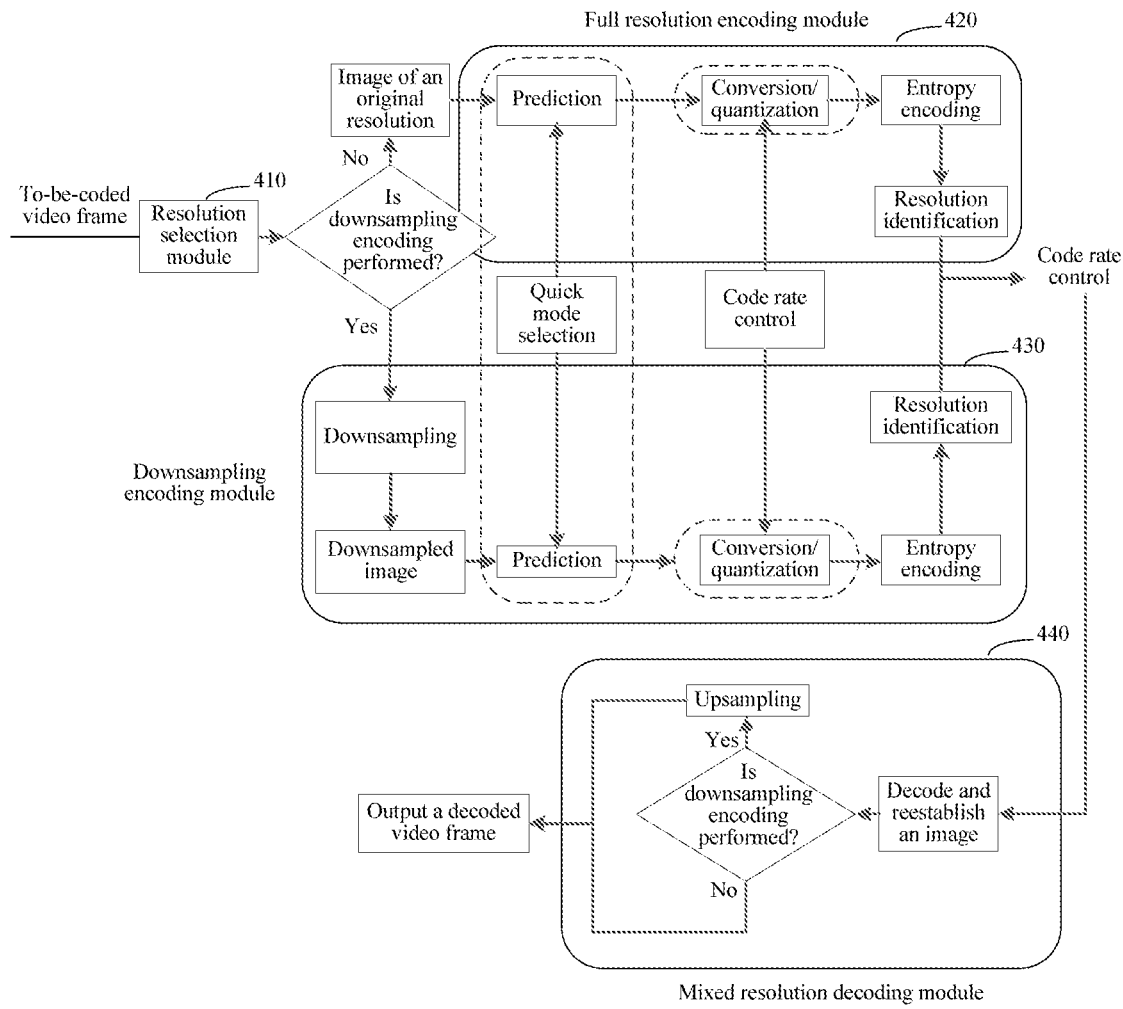
FIG. 11 is a schematic diagram of an encoding and decoding framework according to an embodiment.

FIG. 11 is a block diagram of an encoding and decoding framework to which a video encoding method and a video decoding method are applied in a specific embodiment. A to-be-coded video frame input into an encoding and decoding framework first enters a resolution selection module 410, and a current encoding mode is determined from optional encoding modes according to current coding information and/or image feature information of the to-be-coded video frame. If the current encoding mode is a full resolution mode, the to-be-coded video frame enters a full resolution encoding module 420 that performs full resolution encoding on the current to-be-coded video frame and outputs an encoding code stream. If the current encoding mode is a downsampling mode, the to-be-coded video frame enters a downsampling encoding module 430 that performs downsampling on the current to-be-coded video frame to obtain the current coded video frame, and encodes the current coded video frame and outputs an encoding code stream. The encoding code stream is input into a mixed resolution decoding module 440 for decoding to obtain a reestablished video frame. If the current encoding mode is the downsampling mode, the reestablished video frame is upsampled to obtain a decoded video frame, and otherwise, the decoded video frame is directly output.

Figure 12:
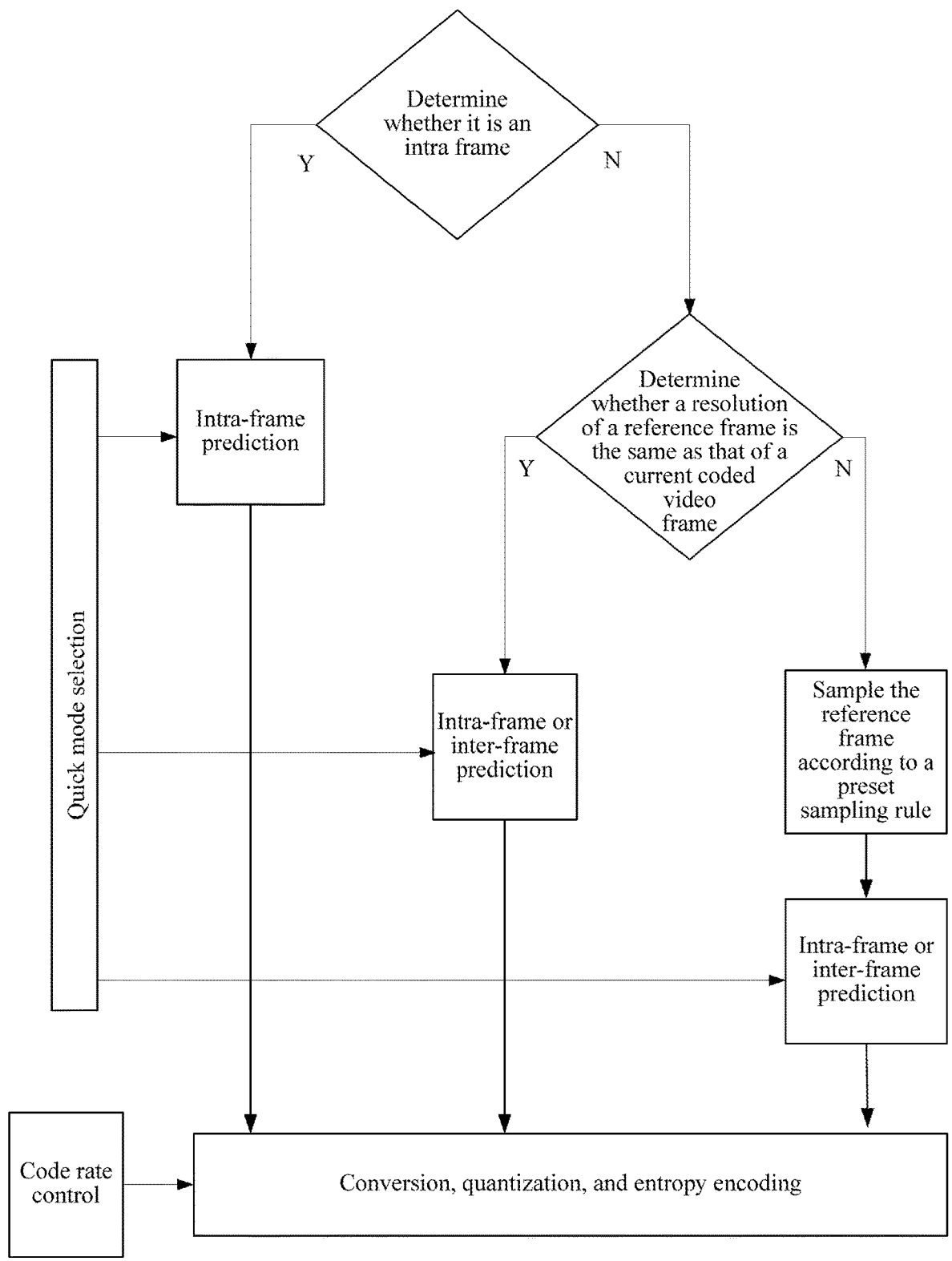
FIG. 12 is a schematic flowchart of encoding in downsampling mode according to an embodiment.

A specific process of encoding by the downsampling encoding module 430, as shown in FIG. 12, is to first determine whether the frame is an intra frame, and if yes, directly perform intra-frame prediction to obtain a prediction residual, and perform conversion, quantization, entropy encoding, and the like to obtain coded data. If the frame is not an intra frame, whether a resolution of the reference frame is the same as that of the current coded video frame is determined, and if yes, intra-frame prediction or inter-frame prediction is performed to obtain a prediction residual, and conversion, quantization, entropy encoding, and the like are performed to obtain coded data. If the resolution of the reference frame is different from that of the current coded video frame, the reference frame is sampled according to a preset sampling, rule to obtain the processing reference frame corresponding to the current coded video frame, then intra-frame or inter-frame prediction is performed to obtain a prediction residual, and conversion, quantization, entropy encoding, and the like are performed to obtain coded data. To improve a prediction mode selection speed in an encoding process, a quick mode selection algorithm may be used. To achieve a target code rate, a quantization parameter is set according to a code rate control algorithm.

In an embodiment, a computer device is further provided. An internal structure of the computer device may be shown in FIG. 2 or FIG. 3. The computer device includes at least one of a video encoding apparatus and a video decoding apparatus. The video encoding apparatus and the video decoding apparatus include various modules, and each module may be entirely or partially implemented by software, hardware, or a combination thereof.

Figure 13:
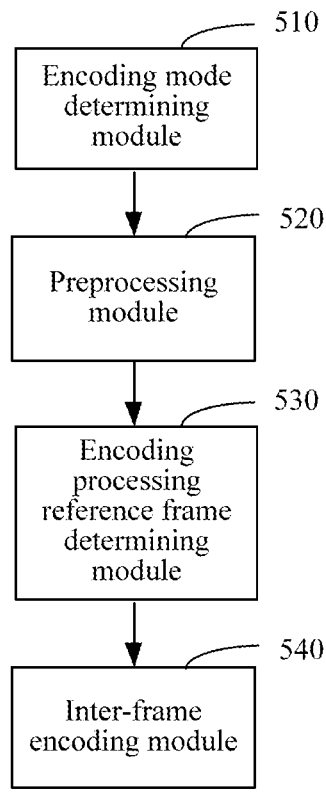
FIG. 13 is a structural block diagram of a video encoding apparatus according to an embodiment.

In an embodiment, as shown in FIG. 13, a video encoding apparatus is provided, including:

an encoding mode determining module 510, configured to: obtain a to-be-coded video frame, determine, from optional encoding modes according to current coding information and/or image feature information of the to-be-coded video frame, a current encoding mode, the optional encoding modes including a full resolution mode and a downsampling mode;

a preprocessing module 520, configured to: process the to-be-coded video frame according to the current encoding mode to obtain a current coded video frame, downsample the to-be-coded video frame to obtain the current coded video frame when the current encoding mode is the downsampling mode, and determine the to-be-coded video frame as the current coded video frame when the current encoding mode is the full resolution mode;

an encoding processing reference frame determining module 530, configured to: obtain a current reference frame corresponding to the current coded video frame when the current coded video frame is an inter frame, and obtain a corresponding processing reference frame according to resolution values of the current reference frame and the current coded video frame, specifically including: determining whether a resolution of the current reference frame is the same as that of the current coded video frame, if yes, directly determining the current reference frame as the processing reference frame, and otherwise, sampling the current reference frame according to a preset sampling rule to obtain the corresponding processing reference frame; and an inter-frame encoding module 540, configured to encode the current coded video frame according to the processing reference frame to obtain first coded data, the first coded data carrying information about the current encoding mode.

In an embodiment, when the current coding information includes quantization parameter information, the encoding mode determining module 510 is further configured to: obtain a current quantization parameter corresponding to the to-be-coded video frame, obtain a frame prediction type of the to-be-coded video frame, obtain a quantization parameter threshold corresponding to the frame prediction type, determine that the current encoding mode is the downsampling mode when the current quantization parameter is greater than the quantization parameter threshold, and otherwise, determine that the current encoding mode is the full resolution mode.

In an embodiment, the current coding information includes code rate information, and the encoding mode determining module 510 is further configured to: obtain a current target code rate corresponding to the to-be-coded video frame, obtain a frame prediction type of the to-be-coded video frame, obtain a code rate threshold corresponding to the frame prediction type, determine that the current encoding mode is the full resolution mode when the current target code rate is greater than the code rate threshold, and otherwise, determine that the current encoding mode is the downsampling mode.

In an embodiment, the image feature information includes motion feature information and texture information, and the encoding mode determining module 510 is further configured to: determine a motion degree according to the motion feature information, determine texture complexity according to the texture information, and determine that the current encoding mode is the downsampling mode when the motion degree exceeds a preset motion threshold or when the texture complexity does not exceed a preset texture threshold, and otherwise, determine that the current encoding mode is the full resolution mode.

Figure 14:
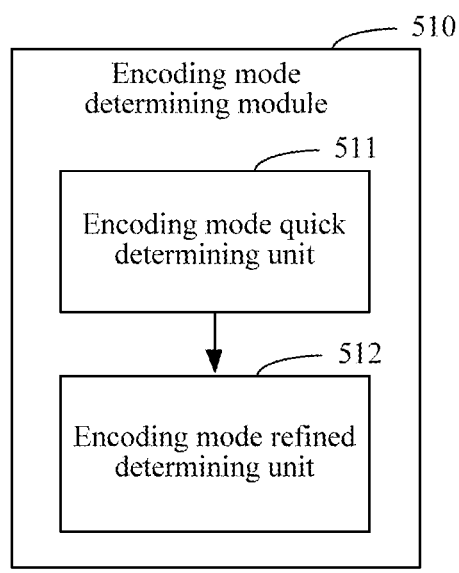
FIG. 14 is a structural block diagram of an encoding mode determining module according to an embodiment.

In an embodiment, as shown in FIG. 14, the encoding mode determining module 510 includes:

an encoding mode quick determining unit 511, configured to obtain the frame prediction type of the to-be-coded video frame, determine that the current encoding mode is the full resolution mode when the to-be-coded video frame is an intra-frame predicted frame, and determine that the current encoding mode is the downsampling mode when the to-be-coded video frame is a bidirectional inter-frame predicted frame; and an encoding mode refined determining unit 512, configured to: determine the current encoding mode according to at least one of the quantization parameter information, the code rate information, and the image feature information when the to-be-coded video frame is a forward inter-frame predicted frame.

Figure 15:
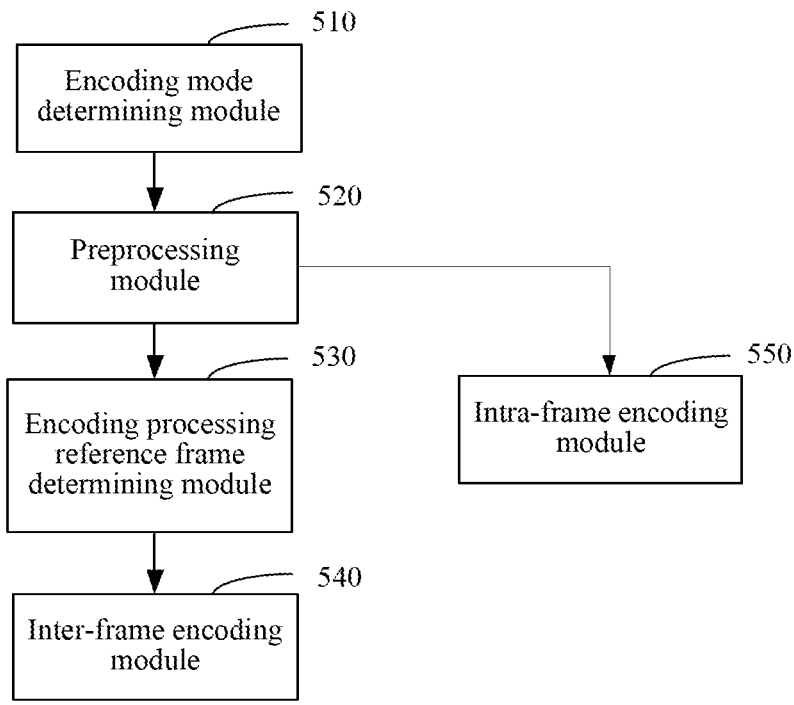
FIG. 15 is a structural block diagram of a video encoding apparatus according to another embodiment.

In an embodiment, as shown in FIG. 15, the apparatus further includes:

an intra-frame encoding module 550, configured to directly perform intra-frame encoding to obtain second coded data when the current coded video frame is an intra frame, the second coded data carrying the information about the current encoding mode.

Figure 16:
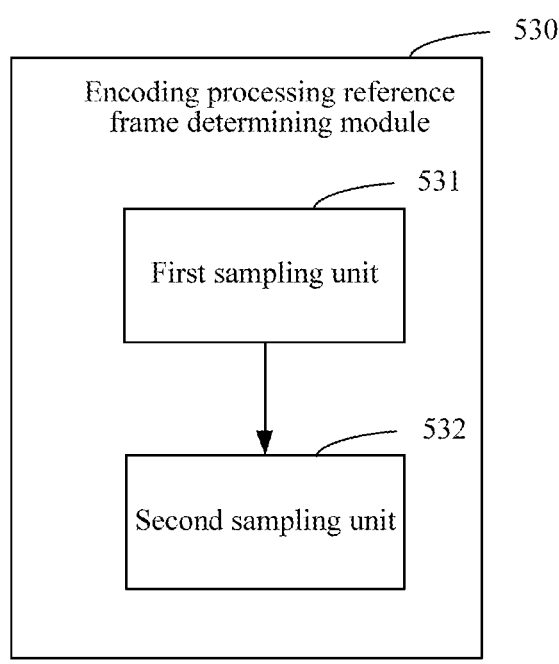
FIG. 16 is a structural block diagram of an encoding processing reference frame determining module according to an embodiment.

In an embodiment, as shown in FIG. 16, the encoding processing reference frame determining module 530 includes:

a first sampling unit 531, configured to downsample the current reference frame to obtain the processing reference frame having a resolution the same as that of the current coded video frame when the resolution of the current reference frame is greater than that of the current coded video frame; and a second sampling unit 532, configured to upsample the current reference frame to obtain the processing reference frame having a resolution the same as that of the current coded video frame when the resolution of the current reference frame is less than that of the current coded video frame.

Figure 17:
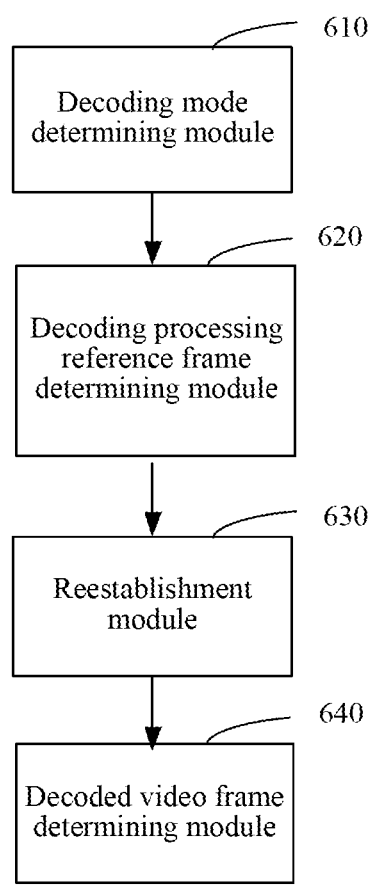
FIG. 17 is a structural block diagram of a video decoding apparatus according to an embodiment.

In an embodiment, as shown in FIG. 17, a video decoding apparatus is provided, including:

a decoding mode determining module 610, configured to: obtain coded data, each coded video frame corresponding to the coded data carrying information about a current encoding mode, and determine a current decoding mode corresponding to a current decoded video frame according to the information about the current encoding mode;

a decoding processing reference frame determining module 620, configured to: obtain a current reference frame corresponding to the current decoded video frame when the current decoded video frame is an inter frame, and obtain a processing reference frame according to resolution values of the current reference frame and the current decoded video frame, specifically: determine whether a resolution of the current reference frame is the same as that of the current decoded video frame, if yes, directly determine the current reference frame as the processing reference frame, and otherwise, sample the current reference frame according to a preset sampling rule to obtain the corresponding processing reference frame;

a reestablishment module 630, configured to decode the current decoded video frame according to the processing reference frame, to obtain a reestablished video frame; and a decoded video frame determining module 640, configured to process the reestablished video frame according to the current decoding mode to obtain a decoded video frame, upsample the reestablished video frame to obtain the decoded video frame if the current decoding mode is the downsampling mode, and determine the reestablished video frame as the decoded video frame if the information about the current encoding mode is the full sampling mode.

It should be understood that the steps in the embodiments of this application are not necessarily performed sequentially in the order indicated by the step labels. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments only describe several implementations of this application, which are described specifically and in detail, and therefore cannot be construed as a limitation to the patent scope of the present disclosure. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A video encoding method, performed by at least one processor, comprising:

obtaining, by the at least one processor, a to-be-coded video frame;

determining, by the at least one processor, a current encoding mode according to current coding information and/or image feature information of the to-be-coded video frame, wherein the current encoding mode is selected from among a full resolution mode and a downsampling mode;

processing, by the at least one processor, the to-be-coded video frame according to the current encoding mode to generate a current coded video frame, wherein the processing comprises downsampling the to-be-coded video frame to generate the current coded video frame based on the current encoding mode being the downsampling mode, and determining the to-be-coded video frame as the current coded video frame based on the current encoding mode being the full resolution mode;

obtaining, by the at least one processor, a current reference frame corresponding to the current coded video frame based on the current coded video frame being an inter frame;

obtaining, by the at least one processor, a corresponding processing reference frame according to resolution values of the current reference frame and the current coded video frame, wherein the obtaining the corresponding processing reference frame comprises directly determining the current reference frame as the processing reference frame based on a resolution of the current reference frame being the same as that of the current coded video frame, and otherwise, sampling the current reference frame according to a preset sampling rule to obtain the corresponding processing reference frame; and encoding, by the at least one processor, the current coded video frame according to the processing reference frame to generate first coded data, the first coded data indicating the current encoding mode.

2. The method according to claim 1, wherein the current coding information comprises quantization parameter information, and wherein the determining the current encoding mode comprises:

obtaining, by the at least one processor, a current quantization parameter corresponding to the to-be-coded video frame;

obtaining, by the at least one processor, a frame prediction type of the to-be-coded video frame;

obtaining, by the at least one processor, a quantization parameter threshold corresponding to the frame prediction type; and determining, by the at least one processor, that the current encoding mode is the downsampling mode based on the current quantization parameter being greater than the quantization parameter threshold, and otherwise, determining that the current encoding mode is the full resolution mode.

3. The method according to claim 1, wherein the current coding information comprises code rate information, and wherein the determining the current encoding mode comprises:

obtaining, by the at least one processor, a current target code rate corresponding to the to-be-coded video frame;

obtaining, by the at least one processor, a frame prediction type of the to-be-coded video frame,
obtaining, by the at least one processor, a code rate threshold corresponding to the frame prediction type; and
determining, by the at least one processor, that the current encoding mode is the full resolution mode based on the current target code rate being greater than the code rate threshold, and otherwise, determining that the current encoding mode is the downsampling mode.

4. The method according to claim 1, wherein the image feature information comprises motion feature information and texture information, and
wherein the determining the current encoding mode comprises:
determining, by the at least one processor, a motion degree according to the motion feature information;
determining, by the at least one processor, texture complexity according to the texture information;
determining, by the at least one processor, that the current encoding mode is the downsampling mode based on the motion degree exceeding a preset motion threshold or based on the texture complexity not exceeding a preset texture threshold, and otherwise, determining that the current encoding mode is the full resolution mode.

5. The method according to claim 2, wherein the method further comprises, after the obtaining the to-be-coded video frame:
obtaining, by the at least one processor, the frame prediction type of the to-be-coded video frame;
determining, by the at least one processor, that the current encoding mode is the full resolution mode based on the to-be-coded video frame being an intra-frame predicted frame;
determining, by the at least one processor, that the current encoding mode is the downsampling mode based on the to-be-coded video frame being a bidirectional inter-frame predicted frame; and
determining, by the at least one processor, the current encoding mode according to at least one of the quantization parameter information and the image feature information based on the to-be-coded video frame being a forward inter-frame predicted frame.

6. The method according to claim 1, wherein the method further comprises directly performing, by the at least one processor, intra-frame encoding to generate second coded data based on the current coded video frame being an intra frame, wherein the second coded data indicates the current encoding mode.

7. The method according to claim 1, wherein the sampling the current reference frame according to the preset sampling rule to obtain the corresponding processing reference frame comprises:
downsampling, by the at least one processor, the current reference frame to obtain the processing reference frame having a resolution the same as that of the current coded video frame based on the resolution of the current reference frame being greater than that of the current coded video frame; and
upsampling, by the at least one processor, the current reference frame to obtain the processing reference frame having a resolution the same as that of the current coded video frame based on the resolution of the current reference frame being less than that of the current coded video frame.

8. A computer device comprising:
at least one memory configured to store computer program code; and
at least one processor configured to access the at least one memory and operate as instructed by the computer program code, the computer program code including:
obtaining code configured to cause the at least one processor to obtain a to-be-coded video frame;
determining code configured to cause the at least one processor to determine a current encoding mode according to current coding information and/or image feature information of the to-be-coded video frame, wherein the current encoding mode is selected from among a full resolution mode and a downsampling mode;
processing code configured to cause the at least one processor to process the to-be-coded video frame according to the current encoding mode to generate a current coded video frame, wherein the processing comprises downsampling the to-be-coded video frame to generate the current coded video frame based on the current encoding mode being the downsampling mode, and determining the to-be-coded video frame as the current coded video frame based on the current encoding mode being the full resolution mode;
obtaining code configured to cause the at least one processor to obtain a current reference frame corresponding to the current coded video frame based on the current coded video frame being an inter frame;
obtaining code configured to cause the at least one processor to obtain a corresponding processing reference frame according to resolution values of the current reference frame and the current coded video frame, wherein the obtaining the corresponding processing reference frame comprises directly determining the current reference frame as the processing reference frame based on a resolution of the current reference frame being the same as that of the current coded video frame, and otherwise, sampling the current reference frame according to a preset sampling rule to obtain the corresponding processing reference frame; and
encoding code configured to cause the at least one processor to encode the current coded video frame according to the processing reference frame to generate first coded data, the first coded data indicating the current encoding mode.

9. The computer device according to claim 8, wherein the current coding information comprises quantization parameter information, and
wherein the determining code is further configured to cause the at least one processor to:
obtain a current quantization parameter corresponding to the to-be-coded video frame;
obtain a frame prediction type of the to-be-coded video frame;
obtain a quantization parameter threshold corresponding to the frame prediction type; and
determine that the current encoding mode is the downsampling mode based on the current quantization parameter being greater than the quantization parameter threshold, and otherwise, determine that the current encoding mode is the full resolution mode.

10. The computer device according to claim 8, wherein the current coding information comprises code rate information, and wherein the determining code is further configured to cause the at least one processor to:
    obtain a current target code rate corresponding to the to-be-coded video frame;
    obtain a frame prediction type of the to-be-coded video frame;
    obtain a code rate threshold corresponding to the frame prediction type; and
    determine that the current encoding mode is the full resolution mode based on the current target code rate being greater than the code rate threshold, and otherwise, determine that the current encoding mode is the downsampling mode.

11. The computer device according to claim 8, wherein the image feature information comprises motion feature information and texture information, and
    wherein the determining code is further configured to cause the at least one processor to:
        determine a motion degree according to the motion feature information;
        determine texture complexity according to the texture information; and
        determine that the current encoding mode is the downsampling mode based on the motion degree exceeding a preset motion threshold or based on the texture complexity not exceeding a preset texture threshold, and otherwise, determining that the current encoding mode is the full resolution mode.

12. The computer device according to claim 9, wherein the computer program code further includes:
    obtaining code configured to cause the at least one processor to obtain, the frame prediction type of the to-be-coded video frame, and
    wherein the determining code is further configured to cause the at least one processor to:
        determine that the current encoding mode is the full resolution mode based on the to-be-coded video frame being an intra-frame predicted frame;
        determine that the current encoding mode is the downsampling mode based on the to-be-coded video frame being a bidirectional inter-frame predicted frame; and
        determine the current encoding mode according to at least one of the quantization parameter information and the image feature information based on the to-be-coded video frame being a forward inter-frame predicted frame.

13. The computer device according to claim 8, wherein the computer program code further includes:
    direct intra-frame encoding code configured to cause the at least one processor to directly perform intra-frame encoding to generate second coded data based on the current coded video frame being an intra frame, the second coded data indicating the current encoding mode.

14. The computer device according to claim 8, wherein obtaining code is further configured to cause the at least one processor to:
    downsample the current reference frame to obtain the processing reference frame having a resolution the same as that of the current coded video frame based on the resolution of the current reference frame being greater than that of the current coded video frame; and
    upsample the current reference frame to obtain the processing reference frame having a resolution the same as that of the current coded video frame based on the resolution of the current reference frame being less than that of the current coded video frame.

15. One or more non-transitory storage media storing computer readable instructions, the computer readable instructions, when executed by one or more processors, causing the one or more processors to:
    obtain a to-be-coded video frame,
    determine a current encoding mode according to current coding information and/or image feature information of the to-be-coded video frame, wherein the current encoding mode is selected from among a full resolution mode and a downsampling mode;
    process the to-be-coded video frame according to the current encoding mode to obtain a current coded video frame, wherein the processing comprises downsampling the to-be-coded video frame to obtain the current coded video frame based on the current encoding mode being the downsampling mode, and determining the to-be-coded video frame as the current coded video frame based on the current encoding mode being the full resolution mode;
    obtaining a current reference frame corresponding to the current coded video frame based on the current coded video frame being an inter frame,
    obtaining a corresponding processing reference frame according to resolution values of the current reference frame and the current coded video frame, wherein the obtaining the corresponding processing reference frame comprises directly determining the current reference frame as the processing reference frame based on a resolution of the current reference frame being the same as that of the current coded video frame, and otherwise, sampling the current reference frame according to a preset sampling rule to obtain the corresponding processing reference frame; and
    encode the current coded video frame according to the processing reference frame to generate first coded data, indicating the current encoding mode.

16. The one or more non-transitory storage media according to claim 15, wherein the current coding information comprises quantization parameter information, and
    wherein the computer readable instructions further cause the one or more processors to determine the current encoding mode by:
        obtaining a current quantization parameter corresponding to the to-be-coded video frame;
        obtaining a frame prediction type of the to-be-coded video frame;
        obtaining a quantization parameter threshold corresponding to the frame prediction type; and
        determining that the current encoding mode is the downsampling mode based on the current quantization parameter being greater than the quantization parameter threshold, and otherwise, determining that the current encoding mode is the full resolution mode.

17. The one or more non-transitory storage media according to claim 15, wherein the current coding information comprises code rate information, and
    wherein the computer readable instructions further cause the one or more processors to determine the current encoding mode by:
        obtaining a current target code rate corresponding to the to-be-coded video frame; and
        obtaining a frame prediction type of the to-be-coded video frame;

obtaining a code rate threshold corresponding to the frame prediction type; and determining that the current encoding mode is the full resolution mode based on the current target code rate being greater than the code rate threshold, and otherwise, determining that the current encoding mode is the downsampling mode.

18. The one or more non-transitory storage media according to claim 15, wherein the image feature information comprises motion feature information and texture information, and wherein the computer readable instructions further cause the one or more processors to determine the current encoding mode by:
  determining a motion degree according to the motion feature information;
  determining texture complexity according to the texture information; and
  determining that the current encoding mode is the downsampling mode based on the motion degree exceeding a preset motion threshold or the texture complexity not exceeding a preset texture threshold, and otherwise, determining that the current encoding mode is the full resolution mode.

19. The one or more non-transitory storage media according to claim 16, wherein the computer readable instructions further cause the one or more processors to, after the obtaining the to-be-coded video frame:
  obtain the frame prediction type of the to-be-coded video frame;
  determine that the current encoding mode is the full resolution mode based on the to-be-coded video frame being an intra-frame predicted frame;
  determine that the current encoding mode is the downsampling mode based on the to-be-coded video frame being a bidirectional inter-frame predicted frame; and
  determining the current encoding mode according to at least one of the quantization parameter information and the image feature information based on the to-be-coded video frame being a forward inter-frame predicted frame.

20. The one or more non-transitory storage media according to claim 15, wherein the computer readable instructions further cause the one or more processors to:
  directly perform intra-frame encoding to generate second coded data based on the current coded video frame being an intra frame, the second coded data indicating the current encoding mode.

* * * * *